United States Patent [19]

Geib

[11] Patent Number: 5,984,082

[45] Date of Patent: Nov. 16, 1999

[54] ROLLER-BED CONVEYOR DRIVE ASSEMBLY

[75] Inventor: Randall R. Geib, Manheim, Pa.

[73] Assignee: Fenner, Inc., Manheim, Pa.

[21] Appl. No.: 08/928,936

[22] Filed: Sep. 12, 1997

[51] Int. Cl.[6] .................................................. B65G 13/07
[52] U.S. Cl. ..................................... 198/790; 198/781.11
[58] Field of Search .......................... 198/781.03, 781.04, 198/781.08, 781.09, 781.11, 789, 790, 867.01

[56] References Cited

U.S. PATENT DOCUMENTS

| | | |
|---|---|---|
| 4,458,809 | 7/1984 | White et al. ........................ 198/789 X |
| 4,588,073 | 5/1986 | Abell . |
| 5,176,246 | 1/1993 | Wiggers . |
| 5,582,287 | 12/1996 | Heit et al. ...................... 198/781.09 X |

*Primary Examiner*—James R. Bidwell
*Attorney, Agent, or Firm*—Stephen H. Eland; Dann, Dorfman, Herrell and Skillman

[57] ABSTRACT

An elongated frictional drive pad is attached to an uppermost surface of a drive chain for powering a plurality of rollers in a roller bed. The drive pad is connected to the chain by a plurality of fastening pins which have body portions and enlarged end caps connected to the body portions. The enlarged end caps have diameters greater than the body portions.

8 Claims, 2 Drawing Sheets

ROLLER-BED CONVEYOR DRIVE ASSEMBLY

FIELD OF THE INVENTION

The present invention relates to improvements in article conveyance systems comprised of frictional drive roller-bed assemblies. More particularly, the present invention relates to an improved conveyor drive, which is comprised of a linked drive chain having a frictional drive pad such that the drive pad is frictionally engaged against a plurality of parallel arrayed skate wheel rollers in a roller bed conveyor.

BACKGROUND OF THE INVENTION

Discrete commodity handling has become increasingly important in the information age. Presently, computer processing and telecommunication technology enable businesses to explore the global marketplace, often processing orders for products from distant markets in a matter of seconds. However, such international market access, while theoretically broadening the product market, is often limited by the logistical challenges presented in moving a product from producer to international consumer.

The logistical process utilized by industries to hasten the response to this seemingly instantaneous demand has been through the streamlining of their internal production and shipping practices. One tool utilized by industry to effectuate such streamlining is roller bed conveyor technology. Conveyor technology has grown from the basic inclined bed of skate wheel rollers in which products are propelled by their own inertia or simple gravity, to multi-level computer-controlled delivery systems. Automated conveyors in particular offer industry the ability to move and channel articles in bulk to any location within a facility quickly, offering substantial reduction in time and labor.

Automated conveyor systems such as U.S. Pat. No. 5,211,281 and U.S. Pat. No. 4,266,659 exemplify the type of frictional drive means common throughout the industry. Typically, a frictional sheet belt comprised of rubber or similar material is utilized to drive a plurality of skate wheel rollers. Despite the technological advances in "smart" accumulating conveyor control, modular conveyors etc., the dependability of such automated conveyors is in large part a function of their drive system.

The present state of the art in automated roller bed conveyor drives suffers from the drawbacks of the present frictional drive configuration. Specifically, the frictional drive belt element has a lifespan naturally limited by the loading and usage of the conveyor roller bed, but as often the case with the present configuration, uneven loading decreases the lifespan of the frictional drive belt by increasing the wearout rate and necessitating more frequent belt replacement. Moreover, uneven loading in conveyors utilizing the present configuration is likely to demand careful alignment and/or special devices such as idler rollers, pulleys, etc. to insure proper tracking of the frictional belt over the free moving caster rollers. Mistracking is further aggravated when uneven loading of the belt occurs, as when products accumulate more on one or the other side of the belt.

Decreased lifespan of drive belts due to premature wear necessitates simple belt replacement. However in high volume industries, particularly those with multiple conveyor tracks, such repeated loss of distribution capacity or "down time" frustrates the sole purpose of the system by further delaying product processing. Similarly, belt slippage and mistracking further frustrates the purpose of efficient and cost effective product processing by increasing the risk of product damage. Unpredictable drive forces may impel closely placed products together, damaging precision and fragile products, if not jolting them from the conveyor bed altogether.

The utilization of tracking and belt guidance mechanisms in the art has in some cases decreased belt wear and mistracking at the expense of overall conveyor reliability through the introduction of this additional system hardware.

Presently, an automated conveyor drive design is desired which offers the traditional components of frictional drive systems, that is, frictional conveyor bed coupling in a low cost belt design, but having the added feature of increased belt reliability absent the added requirement of belt guidance hardware.

A current drive system replaces the conventional belt with a chain having a drive pad mounted along one side of the chain. The chain has a run which extends along the length of the roller bed where the rollers are to be driven such that the drive pad frictionally engages the rollers to rotate them as the chain is advanced along the roller bed. The driver pad is subject to wear, damage, and/or contamination, and it must be replaced after intervals of use.

SUMMARY OF THE INVENTION

The present invention seeks to satisfy the current demand in the art for a highly reliable frictional drive system. Specifically, a frictional drive pad is mounted to a drive chain such that the drive pad is retained in place during operation while being readily removed and replaced after intervals of use.

According to one aspect of the Improved Conveyor Drive Assembly the invention provides a resilient frictional hollow drive pad with a plurality of tapered apertures throughout its hollowed length such that the mating of the drive pad to the drive chain provides substantially slip free continuous force operation when connected to an automated conveyor system.

Another aspect of the present invention provides an improved self tracking linkage carrier drive for elimination of unnecessary alignment hardware by incorporating these alignment features into the drive/carrier apparatus.

A further aspect of the present invention provides an improved hollow resilient frictional drive pad enabling demanding conveyor bed loads to deform the hollow drive pad such that frictional surface area is increased to further ensure continuous drive force throughout the increased load demand.

Yet another advantage of the present invention is the plurality of tapered linkage pins having end caps for optimal seating in the frictional drive pad apertures, thereby ensuring consistent fastening to the linkage drive carrier and further safeguarding against mistracking and slippage.

Still other benefits and advantages of the present invention will become apparent to those skilled in the art upon a reading and understanding of the following detailed specification and related drawings.

BRIEF DESCRIPTION OF THE DRAWINGS

The foregoing summary, and the following detailed description, will be best understood when read in conjunction with the attached figures, in which.

DETAILED DESCRIPTION OF THE PREFERRED EMBODIMENT

Figure 3:
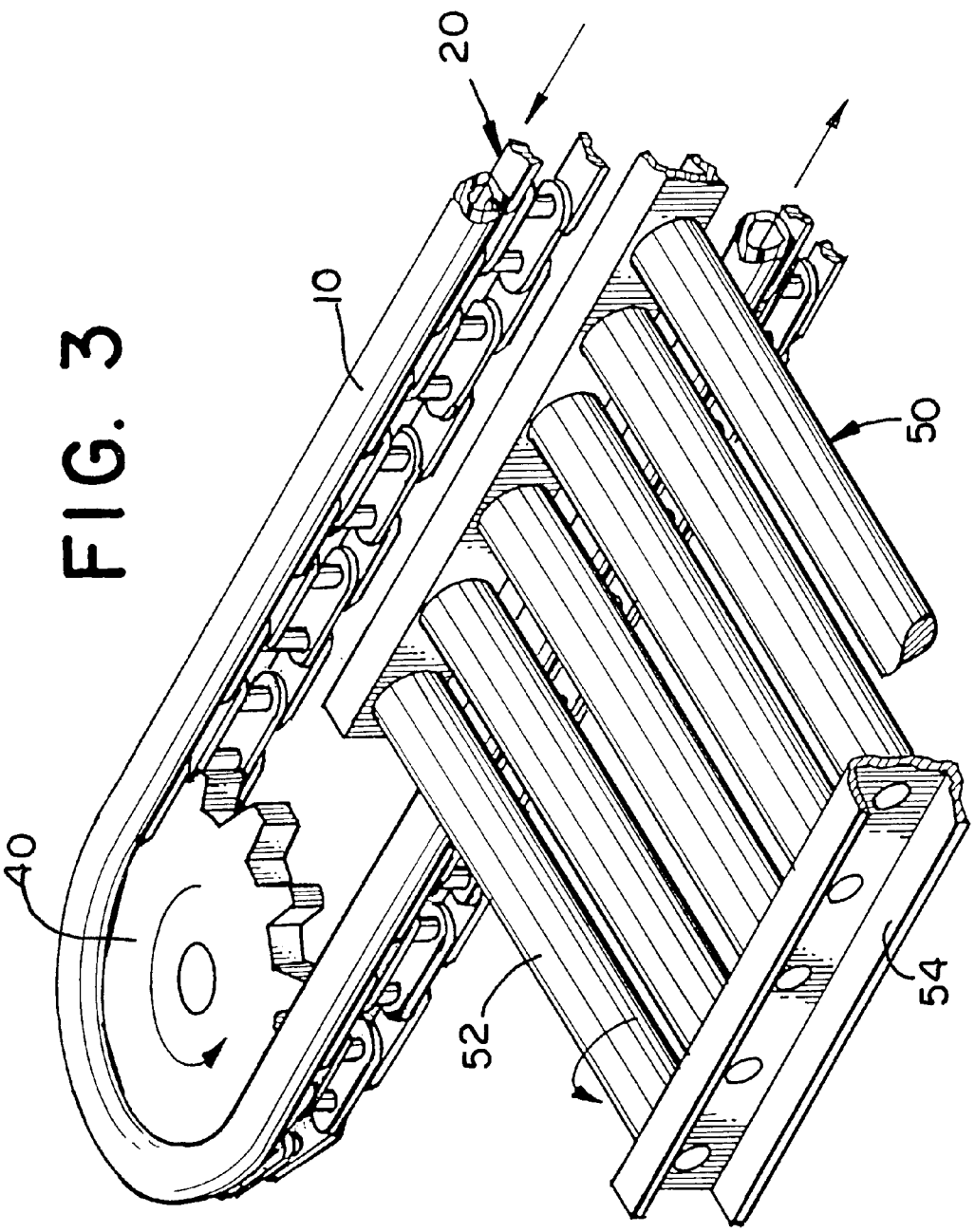
FIG. 3 is a fragmentary perspective view of the improved conveyor drive assembly in a conventional roller bed conveyor.

Referring now to the drawings and more particularly to FIG. 3, the conveyor system is comprised of a linked drive chain 20 having a frictional drive pad 10 secured to one side thereof. The frictional pad engages rollers 52 in a roller bed 50. The chain 20 drives the drive pad 10, which in turn causes the rollers 52 to rotate. The rotation of the rollers 52 conveys articles on top of the roller bed 50.

Figure 1:
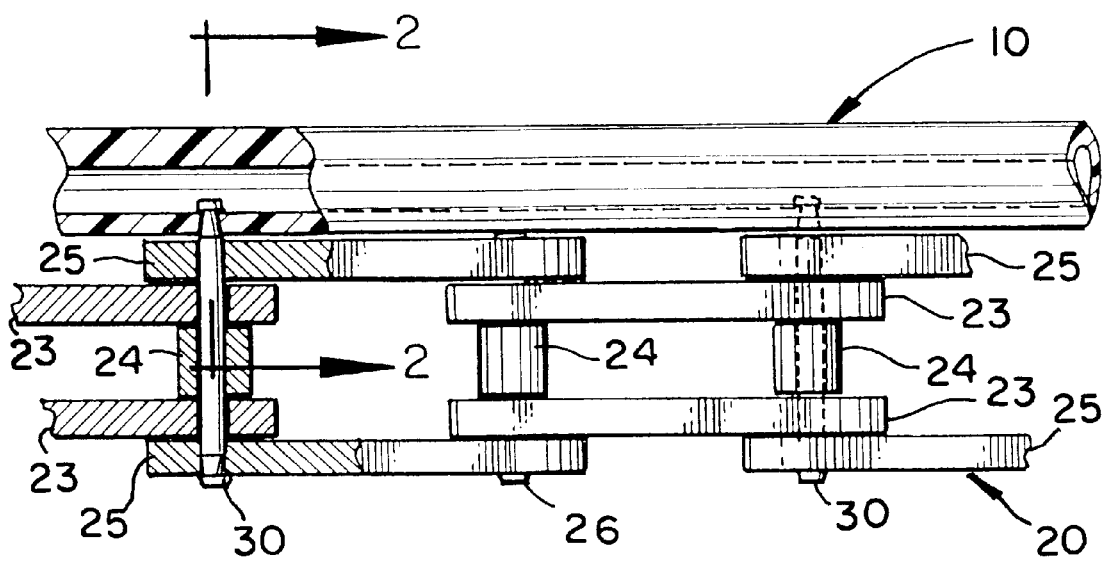
FIG. 1 is a fragmentary side view of the linked drive chain embodying the present invention showing the mounted frictional drive pad with portions broken away to illustrate its construction.
Figure 2:
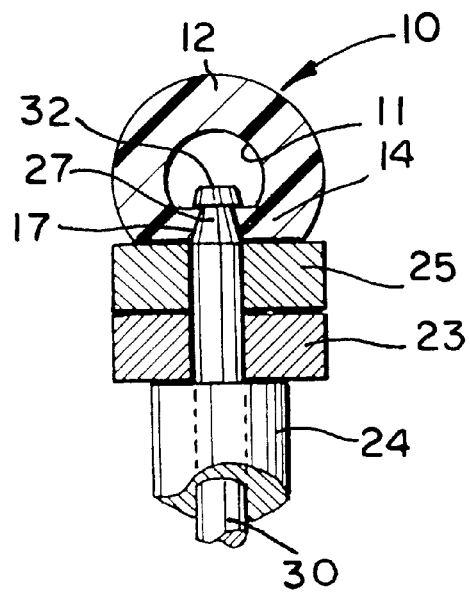
FIG. 2 is a sectional view taken on the line 2—2 of FIG. 1.

As illustrated in FIGS. 1 and 2, the linked drive chain 20 comprises a plurality of interconnecting link plates 23, 25 and spacer collars 24. The link plates are paired into inner sets 23 and outer sets 25. The link plates 23, 25 are pivotally interconnected by link pins 26 and fastening pins 30 which pass through aligned apertures of the link plates 23, 25 and the spacer collars 24. In this way, the height of collars 24 and the lengths of link plates 23, 25 provide equally spaced gear tooth receptacles within the linked drive chain 20. The fastening pins 30 are longer than the link pins 26, and in the present instance the fastening pins alternate with the link pins.

Referring to FIG. 2, the frictional pad 10 is shown fastened to the drive chain 20. The frictional pad 10 comprises an upper wall 12 having an upper contact surface for frictional engagement with the rollers 52 (see FIG. 3) of the roller bed 50. The frictional pad also includes a lower base wall 14 opposing the upper wall 12 and having a fastening surface for mating to the drive chain 20. The frictional pad 10 is tubular in form and coextensive with the drive chain. The upper surfaces of the outer link plate sets 25 form a mounting surface onto which the frictional pad is mounted along the fastening surface of the base wall 14. The frictional pad 10 is preferably composed of a resilient material having a convex contact surface confronting the overhead conveyor bed 50.

In the preferred embodiment, the tubular, frictional pad 10 further comprises a hollow bore 11 extending along the length of the pad to facilitate deformation of the pad contact surface during instances of heavy conveyor loading. The bore 11 of the preferred embodiment is uniform in diameter throughout the length of the pad, so that the top wall 12 and base wall 14 are of uniform width throughout their respective lengths.

In an alternative embodiment, the contact surface of the upper pad wall 12 comprises an integrated tread design for increased frictional coupling of the frictional pad 10 to the roller conveyer bed 50 for applications requiring high speed drives.

The fastening surface of the base wall 14 of the hollow frictional pad 10 is substantially flat and parallel to the drive chain mounting surface. The frictional pad 10 is coupled to the drive chain through a plurality of fastening apertures 17 formed in an aligned series throughout the length of the fastening surface. The apertures 17 are centered on the width of the base wall to ensure proper seating of the frictional pad. Preferably, the apertures 17 taper inwardly through the thickness of the base wall 14, having a greater diameter adjacent the outer fastening surface than adjacent the inner hollow bore 11. However, apertures of uniform diameter are within the scope of the invention.

The hollow frictional pad 10 of FIG. 2 is coupled to the linked drive chain 20 by a plurality of fastener pins 30 projecting from the linked drive chain 20. In the illustrated embodiment, the fastener pins 30 terminate in fastener pin end caps 32. The diameter of each end cap 32 is greater than the diameter of the tapered apertures in the drive pad adjacent the hollow bore. Adjacent each end cap 32, the fastener pins have a narrow neck section 27 connecting the end cap 32 to the body of the fastening pins. The neck section 27 is of a diameter less than the diameter of the body of the fastening pin, preferably tapering into a minimum diameter defined by the junction of the neck and the end cap 32. In this way, a shoulder is formed at the intersection of the end cap 32 and the neck 27. In addition, the neck 27 corresponds in length to the thickness of the base wall 14, and the neck is tapered to cooperate with the tapered apertures 17 in the drive pad. Preferably, the fastening pins include end caps 32 at both ends of the pin 30 so that the pins are symmetrical about their midpoints and the chain links may be assembled by automatic machinery without regard to the orientation of the pins.

The fastener pins 30 are slidably engaged through the inner link plates 23, and spacing collar 24, and extend beyond the outer link members 25. The extended end of the pin 30 engages the drive pad 10, thereby mounting the drive pad on the drive chain 20. To mount the drive pad on the drive chain, the extended end of the fastening pins are inserted into the apertures 17 in the drive pad.

Preferably, each end cap 32 is tapered, and the maximum diameter of each end cap is no larger than the diameter of the body portion of the associated pin. The uppermost diameter of each end cap 32 is smaller in dimension than the widest end of the aperture 17 to enable the pad apertures to be gradually dilated upon installation thereby reducing the possibility of tearing the pad. The larger diameter of end cap 32 temporarily widens the interior diameter of the apertures of the pad 10 as the fastening pin is inserted into the aperture. Because the pad material is resilient, the aperture regains its initial shape after the end cap has been inserted, so that the aperture rests on the pin fastening shoulder formed by the underside of end cap 32.

Once the fastening pin 30 is inserted into the aperture 17, the tapered neck 27 seats in the aperture and the fastening surface of the upper pad wall 12 bears against the mounting surface of the outer link plate sets 25. At the same time, the end cap 32 seats against the interior bore of the frictional pad. In this way, the end cap 32 retains the frictional pad on the drive chain so that the frictional pad will not readily separate from the drive chain during operation. In addition, preferably, the end cap 32 is configured so that the drive pad 10 can be removed from the fastening pins to change the drive pad. Therefore, when a thermoplastic urethane pad is used, the maximum diameter of the end cap preferably is not more than approximately 50% larger than the maximum aperture diameter, and is not more than approximately twice as large as the minimum aperture diameter.

Once connected to the drive chain 20, the frictional pad 10 may tend to constrain the independent movement of the separate links, thereby adversely affecting the pivoted displacement of the links as the chain is carried around the drive gear 40. To reduce this effect, preferably, the shorter link pins 26 alternate with the fastening pins 30. By alternating the fastening pins 30, the distance between the points of connection between the pad and the drive chain is increased, which, in turn, decreases the constraining effect on the drive chain links.

Referring now to FIG. 3, the improved roller bed conveyor drive is shown in the preferred embodiment. Drive gear 40 provides an axis of rotation for the longitudinal run of drive chain 20. The chain 20 is fastened to the frictional driver pad 10 along the length of the contact surface of the upper wall 12 of the pad. The gear 40 has teeth which engage with the receptacles of the chain 20 formed by inner and outer link plates 23, 25, causing the chain run and the driver pad to advance longitudinally. Parallel conveyer bed roller side rails 54 support the skate wheel rollers 52 journaled between the side rails in a parallel array forming a roller bed having a conveying surface parallel to the longitudinal run of the drive chain 20. The bed is positioned above the longitudinal run of the frictional pad such that the longitudinal motion of the frictional pad in one direction along the length of the bed in frictional engagement with the undersides of the parallel rollers, causes the plurality of rollers 52 to rotate as indicated by the arrows in FIG. 3, so as to advance articles resting on the upper sides of the rollers 52.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

I claim:

1. In a roller bed conveyor assembly comprising a pair of parallel side rails extending along the length of the assembly, a plurality of rollers having substantially horizontal axes, and spanning between said side rails in a parallel array to form a roller bed, said rollers being mounted freely rotatable about their axes in said side rails and in spaced parallel relation along the length thereof, said rollers providing an upwardly-facing generally planar conveying surface between said side rails for receiving articles to be conveyed, a drive belt having a longitudinal run extending parallel to said conveying surface and operable to travel along said conveying surface for effecting rotation of said rollers in one direction to advance articles on said conveying surface in one direction along the length of said assembly, said drive belt comprising a drive chain having a plurality of chain links pivotally interconnected by fastening pins passing transversely through said links, at least selected pins having at least one end portion projecting outwardly beyond said links, a frictional driver pad of resilient flexible material coextensive with said chain and carried by the projecting end portions of said fastening pins, said drive pad bearing against said rollers to frictionally engage the rollers and cause rotation thereof when said parallel run of the chain travels along the length of said roller bed, said drive pad being mounted on said drive chain by engagement on the projecting end portions of said fastening pins, the improvement wherein the projecting end portions of said fastening pins have end caps of a given outside dimension, and a body portion of smaller dimension adjacent said end cap, and said driver pad has apertures adapted to receive said projecting end portions, said apertures having a normal dimension corresponding to the smaller dimension of said pin, and adapted to resiliently expand to permit passage of said end cap therethrough.

2. A drive assembly operable to drive a plurality of rollers in a roller bed, comprising:

(a) a drive chain having an uppermost surface;

(b) an elongated frictional pad coextensive with the drive chain, having a hollow bore formed throughout the length of the pad and a plurality of apertures along the length of the pad; and (c) a plurality of fastening pins connecting the pad to the uppermost surface of the drive chain, comprising a body portion and an enlarged end cap connected to the body having a diameter greater than the diameter of the pad apertures;

wherein a distal end of each fastening pin projects into the pad so that the fastening pin is engaged in one of the apertures and the associated end cap is in the bore of the pad to anchor the pad to the chain.

3. The device of claim 2 wherein each fastening pin comprises a neck connecting the end cap to the body portion, wherein the neck has a smaller diameter than the body portion.

4. The device of claim 2 wherein the diameter of each fastening pin body is at least as large as the diameter of the associated end cap.

5. The device of claim 2 wherein the neck of each pin is tapered from a first maximum neck diameter to a second minimum neck diameter, and the minimum diameter is adjacent the pin end cap.

6. The device of claim 2 having a base wall, wherein the apertures are through the base wall and the base wall has a thickness substantially equal to the length of the projecting distal end portion of the fastening pins between said end caps and the uppermost surface of the chain.

7. The device of claim 2 wherein the projecting portion of said fastening pins is tapered from said links to said end cap to provide a shoulder under said end cap, and each frictional pad aperture is tapered such that the smallest aperture diameter is smaller in dimension than said end cap.

8. In an article conveyance drive assembly for rollers of a roller bed adapted to be frictionally coupled to the rollers comprising a drive chain, said chain having a plurality of chain links pivotally interconnected by fastening pins passing transversely through said links and at least selected pins having an end portion projecting outwardly beyond said links, and a frictional drive pad of resilient flexible material coextensive with said chain and carried by the projecting end portions of said fastening pins, said drive pad bearing against the rollers to frictionally engage the rollers and cause conveyance of articles thereon when said drive pad is advanced, said drive pad being mounted on said drive chain by engagement on the projecting end portions of said fastening pins, the improvement wherein the projecting end portions of said fastening pins having end caps of a given outside dimension, and a neck section of smaller dimension adjacent said end cap, and said drive pad has apertures adapted to receive said projecting end portions, said apertures having a diameter smaller in dimension than said pin end cap, and adapted to resiliently expand to permit passage of said end cap therethrough.

\* \* \* \* \*